Nov. 23, 1948.                    E. NUDELMAN                    2,454,669
                              ANIMATED TOY BOOK
                              Filed July 18, 1946
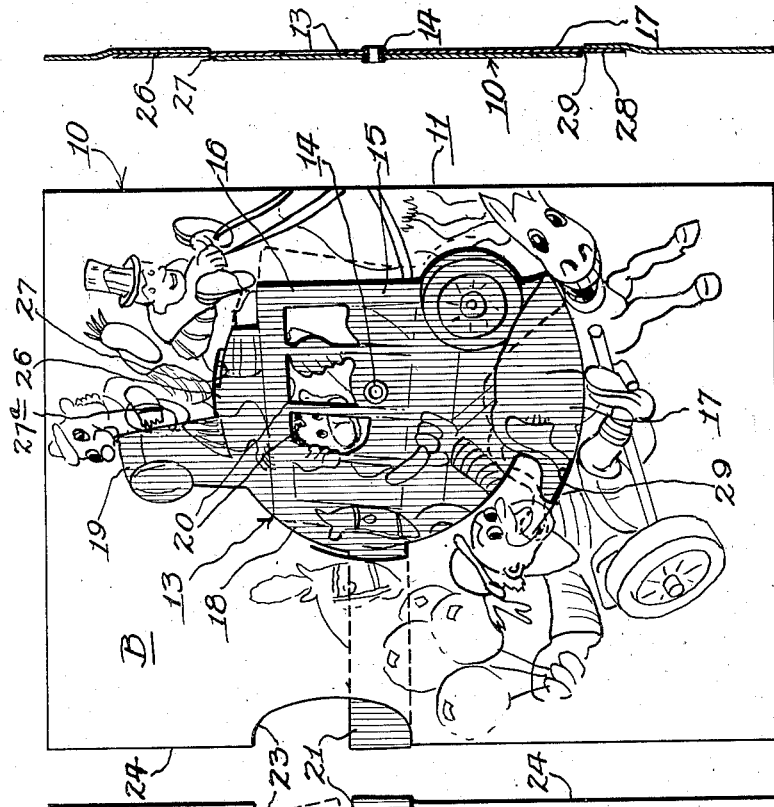
Fig. 3
Fig. 2
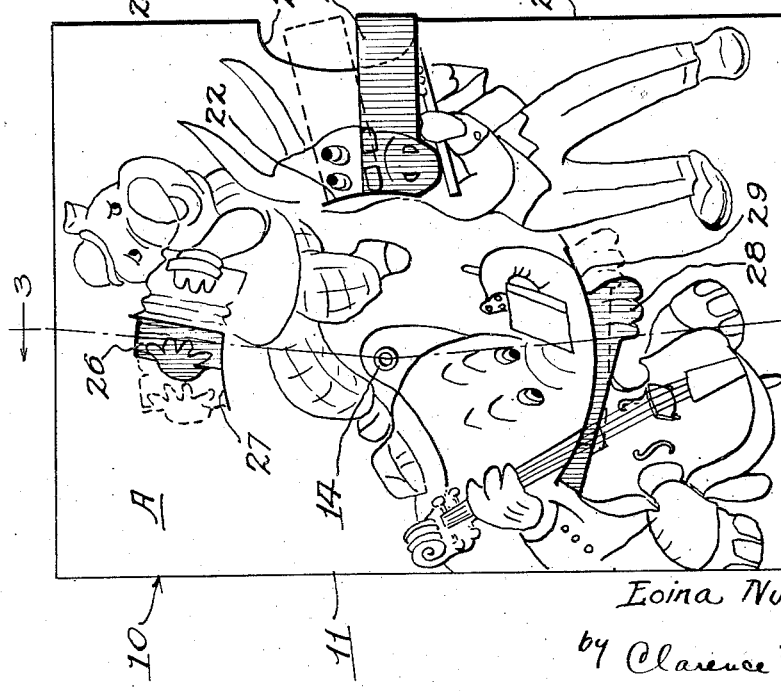
Fig. 1
INVENTOR.
Edina Nudelman
by Clarence F. Poole
                Atty Patented Nov. 23, 1948

2,454,669

UNITED STATES PATENT OFFICE 2,454,669

ANIMATED TOY BOOK

Eoina Nudelman, Chicago, Ill., assignor to Whitehall Publishing Company, Chicago, Ill., a corporation of Illinois Application July 18, 1946, Serial No. 684,488

2 Claims. (Cl. 46—36)

This invention relates to improvements in animated pictures or cartoons of the kind used in book form, designed for the entertainment of children.

One form of animated picture books of the kind heretofore in common use consists of a plurality of pages, each formed of double thickness to provide an envelope for moving picture elements which are mounted therein and are visible or extend through suitable apertures or slits formed in each page. To provide a single page with different pictures on both sides, the necessary page structure, including a suitable envelope with different moving parts for the two pictures on opposite faces, requires considerable expense in design and construction, and also places definite limitations on the character of the animations which can be satisfactorily produced.

In carrying out my invention, I provide an improved and more economical form of animated cartoon wherein each page of paper, cardboard or the like consists of but a sheet of single thickness, and one or more moving parts, also of single thickness, projecting in part through suitable openings or slits in the single sheet, so as to form moving elements of entirely different pictorial representations on each side of the page. In this manner, each single sheet, and the one or more movable parts, form the basis for two different pictures or cartoons, thereby reducing the expense of printing and manufacture of books of this kind to a minimum.

The invention may best be understood by reference to the accompanying drawing, in which:

Figure 1 is a view of one side of a page embodying my invention.

Figure 2 is a view of the opposite side of the page shown in Figure 1.

Figure 3 is a section taken on line 3—3 of Figure 1.

Referring now to details of the illustrative embodiment of my invention shown in the drawing, 10 indicates generally a sheet of single thickness, made of heavy paper, cardboard or the like, which may, for convenience, be mounted as a page in a book (not shown) by hinging said sheet along one side margin 11. The sheet 10 has a pictorial representation, indicated generally at A of Figure 1, on one side, and an entirely different pictorial representation indicated generally at B, of Figure 2 on the other side. These pictorial representations, of course, may be of infinite variation as to subject matter, in the illustrative form shown herein, the two pictures being especially designed for amusement of children. It will be observed that the picture A shows a pig playing a concertina, a donkey playing a flute, and an elephant playing a bass viol. The picture B shows a part of a circus parade, including a clown driving a donkey cart, and a wheeled animal cage with a monkey therein driven by another clown, followed by the plumed horses of another circus vehicle.

Animation of the two pictures A and B is produced by a moving member, indicated generally at 13, herein consisting of a sheet of single thickness which is rockably mounted on one side of the page 10 as by a pivot 14. The moving member is cut to a suitable shape and is decorated on its exposed side adjacent its pivotal mounting so as to form a part of that pictorial representation on the corresponding side of the sheet. Thus, in the form shown, the moving member 13 has a central portion 15 overlying the picture B (see Figure 2) adjacent its pivot 14, and is cut away at one side 16 to form part of the front of the wheeled cage, a lower part 17 forms part of the kicking donkey, including a hind leg and tail, its opposite side is cut along an arcuate line 18 to include the rear part of the wheeled cage and one of the plumed horses' heads following the cage, said moving member is also provided with an upwardly extending projection 19 forming one of the cymbals in the paws of a bear on top of the cage, and the central portion is also cut out at 20, 20 to disclose the monkey behind its bars.

The moving member 13 is manipulated by a suitable operating lever, herein consisting of a strip 21 formed integral with said moving member and extending laterally through a slit 22 in the page 10, and thence into a cut away portion 23, formed in the free margin 24 of said page, in position to be grasped by the fingers, to rock the moving member on its pivot. Such rocking movement produces multiple amination effects in picture B which will be obvious from Figure 2.

Referring now to Figure 1, showing picture A, it will be observed that the moving member 13 is further provided with projecting marginal portions which extend through suitable openings or slots in the page 10 so as to produce entirely different animation effects on picture A. For instance, the strip 21, which forms the operating lever as previously described, is arranged to extend across the face of the musical donkey, and forms the nose of the donkey with glasses thereon. Another tab 26 extends from the upper edge of the rocking member 13, as a lateral extension of projection 19, passing through a slot 27, 27a to form a paw and part of the concertina which is being played by the pig in picture A. Also, a tab 28 is formed as an extension of the lower part 17 of picture B (Figure 2), which projects through the arcuate slot 29 in the page so as to form the elephant's paw and the viol bow, in picture A (see also Figure 3).

It will now be understood that the same manipulation of the moving member 13, by rocking it about its pivot, will produce two wholly different animation effects on opposite sides of the same page in a manner of particular wonderment and surprise to the youthful observer.

From the standpoint of construction, it will be observed that the marginal portions of the moving member 13 extend through their respective slots so as to interleave the two parts together, thus giving an especially simple, compact and economical type of structure for the purpose described.

I claim:

1. In an animated picture a single page having different pictorial representations on opposite sides thereof, and a flat member mounted for limited pivotal movement on one side of said page and having its visible portions provided with a pictorial representation corresponding with and complementing the picture on the aforesaid side of the page, so as to produce an animated effect on its respective picture when rocked about its pivot, said rocking member also having portions extending through openings in said page, with those portions thereof visible from the opposite side of said page provided with pictorial representations corresponding with the picture on its respective side of the page, so as to produce an appropriate animated effect on the last-mentioned picture when said flat member is rocked.

2. In an animated picture a single page having different pictorial representations on opposite sides thereof, and a flat member mounted for limited pivotal movement on one side of said page and having its visible portions provided with a pictorial representation corresponding with and complementing the picture on the aforesaid side of the page, so as to produce an animated effect on its respective picture when rocked about its pivot, said rocking member also having one or more marginal portions extending through slits in said page, with those portions thereof visible from the opposite side of said page provided with pictorial representations corresponding with the picture on its respective side of the page, so as to produce an appropriate animated effect on the last-mentioned picture when said flat member is rocked.

EOINA NUDELMAN.

No references cited.